(12) United States Patent
Liu et al.

(10) Patent No.: US 9,540,494 B2
(45) Date of Patent: Jan. 10, 2017

(54) SILICONE COMPOSITIONS AND RELATED METHODS

(71) Applicant: 3M INNOVATIVE PROPERTIES COMPANY, Saint Paul, MN (US)

(72) Inventors: Junkang J. Liu, Woodbury, MN (US); Pingfan Wu, Woodbury, MN (US); Feng Bai, Woodbury, MN (US); David A. Ylitalo, Stillwater, MN (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 0 days.

(21) Appl. No.: 14/424,473

(22) PCT Filed: Sep. 3, 2013

(86) PCT No.: PCT/US2013/057769
§ 371 (c)(1),
(2) Date: Feb. 27, 2015

(87) PCT Pub. No.: WO2014/039414
PCT Pub. Date: Mar. 13, 2014

(65) Prior Publication Data
US 2015/0259495 A1    Sep. 17, 2015

Related U.S. Application Data

(60) Provisional application No. 61/698,088, filed on Sep. 7, 2012.

(51) Int. Cl.
C08L 83/04    (2006.01)
C08J 9/12    (2006.01)
(Continued)

(52) U.S. Cl.
CPC .............. C08J 9/125 (2013.01); C08G 77/70 (2013.01); C08J 9/0061 (2013.01); C08L 83/04 (2013.01);
(Continued)

(58) Field of Classification Search
None
See application file for complete search history.

(56) References Cited

U.S. PATENT DOCUMENTS 4,368,279 A * 1/1983 Modic .................. C08J 9/30
521/122
4,418,157 A   11/1983 Modic
(Continued)

FOREIGN PATENT DOCUMENTS

| JP | 2010-111838 | 5/2010 |
| WO | WO 2010-056541 | 5/2010 |
| WO | WO 2010-056543 | 5/2010 |

OTHER PUBLICATIONS

Grande, "Anhydrous Formation of foamed silicone elastomers using the piers Rubinsztajn reaction", Polymer, 2012, vol. 53, pp. 3135-3142.
(Continued)

Primary Examiner — Robert S Loewe
(74) Attorney, Agent, or Firm — 3M Innovative Properties Company; Lynn R. Hunsberger

(57) ABSTRACT

Crosslinked silicone foams are provided that can be substantially free of chemical blowing agents or byproducts thereof. These foams can be prepared from polymerizable silicone compositions that include an MQ-water cluster including a silicate MQ resin and a quantity of water dispersed in the silicate MQ resin and a silicone fluid, wherein the MQ-water cluster and silicone fluid collectively provide a inverted emulsion having a continuous and a discontinuous phase, the continuous phase including the
(Continued)

$R = - OSiR_1R_2R_3$ silicone fluid and the discontinuous phase including the MQ-water cluster. The foams can be made by dispersing water into a silicate MQ resin to provide an MQ-water cluster; dispersing the stabilized MQ-water cluster into a silicone fluid to obtain an inverted silicone emulsion having the MQ-water cluster as a discontinuous phase and the silicone fluid as a continuous phase; foaming the silicone emulsion by evolving the water in the MQ-water cluster to provide a cellular structure; and polymerizing the silicone emulsion.

15 Claims, 4 Drawing Sheets

(51) Int. Cl.
    *C08G 77/00*      (2006.01)
    *C08J 9/00*      (2006.01)

(52) U.S. Cl.
    CPC ......... *C08J 2201/03* (2013.01); *C08J 2203/10* (2013.01); *C08J 2205/05* (2013.01); *C08J 2383/04* (2013.01); *C08J 2383/06* (2013.01); *C08J 2483/06* (2013.01)

(56) References Cited

U.S. PATENT DOCUMENTS

| | | | |
|---|---|---|---|
| 4,547,529 A * | 10/1985 | Lee | ............ C08J 9/12 521/122 |
| 4,721,391 A | 1/1988 | Bauer | |
| 4,767,794 A | 8/1988 | Modic | |
| 4,810,728 A | 3/1989 | Gross | |
| 4,859,712 A | 8/1989 | Cox | |
| 5,332,762 A | 7/1994 | Maschberger | |
| 5,356,940 A | 10/1994 | Giesen | |
| 5,436,274 A | 7/1995 | Sumpter | |
| 5,438,081 A | 8/1995 | Lewis | |
| 5,461,134 A | 10/1995 | Leir | |
| 5,545,676 A | 8/1996 | Palazzotto | |
| 5,661,192 A | 8/1997 | Giraud | |
| 5,670,555 A | 9/1997 | Loiselle | |
| 5,683,527 A | 11/1997 | Angell | |
| 5,985,947 A | 11/1999 | Hagen | |
| 6,359,026 B1 | 3/2002 | Marquardt | |
| 6,746,761 B2 | 6/2004 | Janoff | |
| 6,818,673 B2 | 11/2004 | Ferguson | |
| 6,892,817 B2 | 5/2005 | Janoff | |
| 7,393,879 B1 | 7/2008 | Kresta | |
| 7,482,391 B1 * | 1/2009 | Cross | ............ C08J 9/02 521/110 |
| 7,883,652 B2 | 2/2011 | Leir | |
| 8,536,241 B2 | 9/2013 | Hamer | |
| 2008/0214688 A1 | 9/2008 | Hirabayashi | |
| 2008/0318058 A1 | 12/2008 | Sherman | |
| 2009/0142573 A1 | 6/2009 | Oh | |
| 2009/0226623 A1 * | 9/2009 | Liu | ............ C08G 77/06 427/387 |
| 2010/0003484 A1 | 1/2010 | Blanc | |
| 2011/0092638 A1 | 4/2011 | Leir | |
| 2011/0192564 A1 * | 8/2011 | Mommer | ............ H01M 2/1094 165/10 |
| 2011/0206923 A1 | 8/2011 | Liu | |

OTHER PUBLICATIONS

International Search Report for PCT Application No. PCT/US2013/057769 mailed on Dec. 17, 2013, 3 pages.

\* cited by examiner

R = - OSiR₁R₂R₃

SILICONE COMPOSITIONS AND RELATED METHODS

CROSS REFERENCE TO RELATED APPLICATIONS

This application is a national stage filing under 35 U.S.C. 371 of PCT/US2013/057769, filed 3 Sep. 2013, which claims priority to U.S. Provisional Application No. 61/698,088, filed 7 Sep. 2012, the disclosures of which are incorporated by reference in their entirety herein.

FIELD OF THE INVENTION

Provided are compositions, articles, and methods related to polymeric foams. The polymeric foams are more particularly silicone foams, and optionally have elastomeric properties.

BACKGROUND

Silicones are synthetic polymers based on chains or networks of alternating silicon and oxygen atoms. Also called polymerized siloxanes or polysiloxanes, silicones have the general chemical formula $[R_2SiO]_n$, where R is an organic group such as methyl, ethyl, or phenyl. Chemically, these materials have an inorganic silicon-oxygen backbone ( . . . —Si—O—Si—O—Si—O— . . . ) with organic side groups attached to the silicon atoms. Silicones are generally known for their uses as electrical insulators, waterproofing agents, rubbers and resins.

Foams may have either an open-celled or closed-celled microstructure. Open-cell foams have voids that generally intersect one another, forming paths that percolate through the material. These foams tend to be soft and compressible compared to closed cell foams. Open-cell foams are also generally lower density than closed cell foams and are somewhat less expensive, since less material is needed per unit volume. Closed cell foams, on the other hand, use isolated voids that do not communicate with each other. As such, these foams tend to be stronger and resist compression. Moreover, gases and fluids cannot penetrate through closed cell foams, making closed cell foams useful in certain insulation applications where absorption of water would not be desirable.

Various methods can be used to prepare foamed polymers. Some involve use of a physical or chemical blowing agent. Physical blowing agents are generally volatile liquids that can be used to create voids in a matrix, thereby producing a cellular (or foamed) material. Common physical blowing agents include chlorofluorocarbons, hydrochlorofluorocarbons, hydrocarbons and liquid carbon dioxide. Chemical blowing agents expand the foam using one or more chemical reactions that produce a gas. An exemplary chemical blowing agent is powdered titanium hydride, which can be used to make metallic foams by decomposing into titanium and hydrogen gas at elevated temperatures. Other foaming methods have also been reduced to practice, including mechanical frothing, extraction of soluble fillers, and use of hollow sphere and/or porous particles.

Silicone materials in general have low thermal conductivity, low chemical reactivity, low toxicity, good oxidation stability and good thermal stability (i.e. their properties do not significantly change over a wide temperature range). These properties make them particularly useful in thermo-acoustic, electrical insulation, and sealing applications that demand high temperature resistance, low smoke generation, and/or high biocompatibility. These include, for example, medical applications and transportation applications in aircraft, ships, and railway systems. Silicone foams also offer potential cost savings based on their reduced material cost when compared with solid silicone elastomers.

SUMMARY

One of the potential disadvantages of using blowing agents, frothing, fillers, and hollow or porous particles to create voids in a foam is the potential introduction of impurities into the foam material. This can be problematic in applications where such impurities might cause an adverse chemical or biological reaction. Another limitation faced by some of these methods is the lack of independence between the steps of foaming of the material and the polymerization of the foam material. If these processes occur simultaneously, it can be technically challenging to obtain a desirable cell size and/or obtain a suitable distribution of cell sizes.

The provided foamed silicone articles, compositions and methods use water as a physical blowing agent. Although water is volatile liquid, it is generally difficult to use water as a blowing agent because it is generally incompatible with organic polymers and tends to form unstable systems that undergo phase separation quickly. Surprisingly, it was discovered that a silicone precursor derived from tetraalkoxysilane (Q-unit) and trimethylethoxysilane (M-unit), known as "MQ resin," can effectively absorb a significant amount of water to obtain a stable MQ-water cluster. Because the water can be subsequently removed by vaporization, this MQ-water cluster can act as a blowing agent to provide foamed silicone structures.

In one aspect, a silicone foam is provided. The silicone foam comprises: a crosslinked silicone network of polysiloxane and a silicate resin, the silicone network being substantially free of any chemical blowing agents or byproducts thereof; and a multiplicity of voids embedded in the silicone network to provide a cellular structure.

In another aspect, a polymerizable silicone composition comprising: an MQ-water cluster comprised of a silicate MQ resin and a quantity of water dispersed in the silicate MQ resin ranging from about 1 percent to about 99 percent of the overall weight of the MQ-water cluster; and a silicone fluid, wherein the MQ-water cluster and silicone fluid collectively provide a inverted emulsion having a continuous and a discontinuous phase, the continuous phase comprising the silicone fluid and the discontinuous phase comprising the MQ-water cluster.

In yet another aspect, a method of making a silicone foam comprising: dispersing a quantity of water into a silicate MQ resin to provide an MQ-water cluster; dispersing the stabilized MQ-water cluster into a silicone fluid to obtain an inverted silicone emulsion having the MQ-water cluster as a discontinuous phase and the silicone fluid as a continuous phase; and foaming the silicone emulsion by evolving the water in the MQ-water cluster to provide a cellular structure.

DETAILED DESCRIPTION

Figure 1:
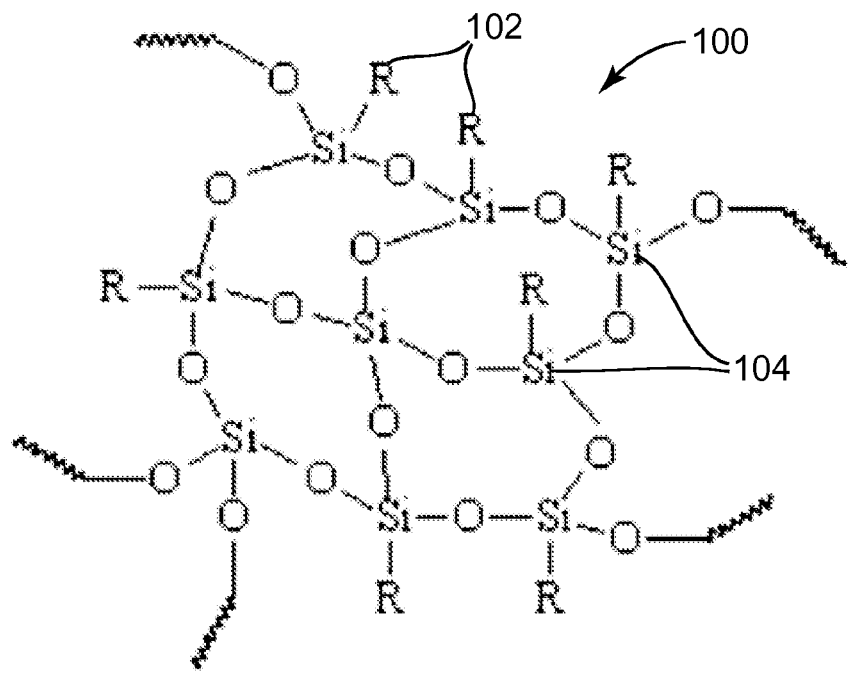
FIG. 1 shows a chemical structure of a resin component in one exemplary embodiment.

In several places throughout the application, guidance is provided through lists of examples, which examples can be used in various combinations. In each instance, the recited list serves only as a representative group and should not be interpreted as an exclusive list.

Any recitation of numerical ranges by endpoints includes all numbers subsumed within that range (e.g., 1 to 5 includes 1, 1.5, 2, 2.75, 3, 3.80, 4, 5, etc.).

The terms "a," "an," "the," "at least one," and "one or more" are used interchangeably. Thus, for example, method comprising the step of providing "a" foam article can be interpreted to mean that the method comprises the step of providing "one or more" foam articles.

The present articles, assemblies, kits, and methods relate to silicone foams. These foams derive from polymerizable compositions which are capable of being polymerized and then dried to afford finished foam materials. In preferred embodiments, the polymerizable compositions are, in turn, stabilized silicone emulsions that include at least a silicate MQ resin, a silicone fluid, and a quantity of water. Optionally, the emulsion may additionally contain other components, including but not limited to, pigments, dyes, antioxidants, catalysts, initiators, surfactants, tackifiers, plasticizers, crosslinkers, filler particles, flame retardants, antimicrobial agents, rheology modifiers, compatible fluids, incompatible fluids, and hollow microspheres. Finished silicone foams generally contain polymerized analogs of the MQ resin and silicone fluid referred to above.

The term "silicone," as used herein, includes polymers that contain units with dialkyl or diaryl siloxane (—SiR$_2$O—) repeating units. Silicone-based polymers may be segmented copolymers or polysiloxane polymers. The terms siloxane and silicone are used interchangeably.

MQ Resin

Silicate resins include resins composed of certain structural units. These can include, for example, monovalent ("M") units having the structure R$_3$SiO—, divalent ("D") units having the structure R$_2$SiO$_2$=, trivalent ("T") units having the structure RSiO$_3$≡, quaternary ("Q") units having the structure =SiO$_4$=, and combinations thereof, where R is generally either a methyl (—CH$_3$) or hydroxyl (—OH) group. These units are effectively building blocks in the formulation of a low to medium molecular weight silicone resin. Common silicone resins include resins built from D- and T-units (DT resins) or from M- and Q-units (MQ resins). Many other combinations (for example, MDT, MTQ, and QDT) are also possible and have been used in industrial applications and can be used in the provided articles. Broadly speaking, these silicate units can be combined to provide branched, cage-like oligosiloxanes having the general formula R$_n$SiX$_m$O$_y$, where R is a non-reactive substituent (such as methyl group), and X is a functional group such as H, OH, Cl, or OR.

In the case of MQ resins, each M-unit is generally bonded to a Q-unit and each Q-unit is generally bonded to at least one other Q-unit. It was discovered that the MQ resin has particular properties enabling foaming applications with water as a physical blowing agent. In preferred embodiments, at least some of the MQ resin comprises a three-dimensional silicate network including M- and Q-units as follows:

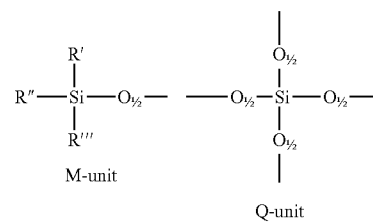

where each of R', R", and R'" is either a methyl or hydroxyl group and at least one of R', R", and R$_3$'" is a hydroxyl group. In the M-unit above, for example, exactly one of R', R", and R'" could be a hydroxyl group while the remaining two are methyl groups. Alternatively, exactly two of R', R", and R'" above could be hydroxyl groups, while the remaining one is a methyl group. As still another alternative, all three of R', R", and R'" above could be hydroxyl groups.

FIG. 1 shows an exemplary MQ resin having a chemical structure broadly designated by the numeral 100. As illustrated, the structure 100 includes the M-units 102 and Q-units 104 as defined above.

The MQ resin may be substantially pure. In other words, the MQ resin can essentially contain only M-units 102 and Q-units 104, as defined above. Such a resin may, however, be subject to limitations in its manufacturing and contain only small amounts of impurities. This aspect can be important in medical applications involving contact with the skin, where small molecules remaining in the foam could induce undesirable reactions to a patient. In some cases, the impurities themselves could be polymerizable species—for example, other chemical units such as the D- or T-units defined above. In a preferred embodiment, the MQ resin is provided in the form of a powder having a bulk density of about 0.25 grams per cubic centimeter and a mean particle size of about 10 micrometers.

In a preferred embodiment, the M- and Q-units 102, 104 are present in a stoichiometric ratio of at least about 1 to 20, at least about 1 to 5, at least about 1 to 3, at least about 1 to 2, or at least about 3 to 5, respectively.

If desired, the level of hydroxyl groups (or silanol groups) in the MQ resin may be reduced by reacting the MQ resin with hexamethyldisilazane. This reaction could be facilitated with a catalyst such as trifluoroacetic acid. Trimethylchlorosilane or trimethylsilylacetamide may be reacted with the MQ resin without need for a catalyst. As a result of this reaction, the level of hydroxyl groups could be reduced to up to about 5 percent, up to about 3 percent, up to about 1.5 percent, up to about 1.2 percent, or up to about 1 percent, based on the overall weight of the MQ resin.

In other embodiments, the MQ resin may represent a copolymer that is substantially composed of one or more other chemical units, such as D- or T-units or other structural units.

Suitable silicate resins such as those described above are available from sources such as Dow Corning (Midland, Mich.), Momentive Performance Materials (Columbus, Ohio), and Wacker Chemie AG (München, GERMANY).

As a further alternative, the MQ resin could be blended with one or more other compatible resins to form a homogeneous or stabilized blend. Compatible resins that are distinct from the MQ resin could include, for example, silicate resins that contain D- or T-units.

In some embodiments, the MQ resin is a tackifying polymer. For example, the MQ resin could be dispersed or dissolved in a silicone matrix to adjust the rheology of the composition. The amount of MQ resin in the composition can also affect the tackiness or "stickiness" of the resulting silicone foam.

Silicone Fluids

The silicone fluid represents another major component of the precursor composition used to make the silicone foam. The silicone fluid is preferably a polymerizable silicone fluid that is chemically compatible with the MQ resin. The silicone fluid could be oligomeric or polymeric. The oligomers and polymers generally include one or more reactive silanol groups. In a preferred embodiment, the silicone fluid includes a silanol-terminated polydimethylsiloxane oligomer.

The polydimethylsiloxane oligomer is preferably flowable, but not limited to any particular range or distribution of molecular weight. The polydimethylsiloxane could have, for example, an average molecular weight of at least about 5,000 grams/mol, at least about 15,000 grams/mol, at least about 25,000 grams/mol, at least about 30,000 grams/mol, at least about 35,000 grams/mol, or at least about 40,000 grams/mol. On the upper end, the polydimethylsiloxane could have, for example, an average molecular weight of up to about 500,000 grams/mol, up to about 200,000 grams/mol, up to about 170,000 grams/mol, up to about 160,000 grams/mol, up to about 155,000 grams/mol, or up to about 150,000 grams/mol. Polydimethylsiloxane oligomers suitable for this application include those provided under the trade designation "DMS S51" and "DMS S33" by Gelest, Inc. (Morrisville, Pa.).

Initiators and Catalysts

In some embodiments, one of both of initiators and catalysts may be present. Initiators used in polymerizing the silicone foam include both photosensitive initiators, or "photoinitiators," and thermal sensitive initiators (or thermoinitiators).

Photoinitiators can respond rapidly and efficiently to a light source by producing of radicals, cations, and other species that are capable of initiating a polymerization reaction. The light used to activate the photoinitiators can be, for example, ultraviolet or visible light. Preferably the photoinitiators used in the present invention absorb at wavelengths ranging from about 200 to about 800 nanometers, more preferably from about 250 to about 600 nanometers, most preferably from about 250 to about 450 nanometers.

The photoinitiator may be included in the MQ-water cluster, the silicone fluid, or both. Suitable photoinitiators known in the art include benzyl ketals, alpha-hydroxyalkyl phenones, alpha-amino alkyl phenones, and acylphospine oxides. Specific initiators include 2,4,6-[trimethylbenzoyl-diphosphine]oxide in combination with 2-hydroxy-2-methyl-1-phenylpropan-1-one (available under the trade designation DAROCUR 4265 (BASF Corporation, Ludwigshafen, GERMANY)); benzyl dimethyl ketal (available under the trade designation IRGACURE 651 (BASF Corporation)); 2-hydroxy-2-methyl-1-phenyl-propan-1-one (available under the trade designation DAROCUR 1173 (BASF Corporation)); 2-methyl-1-[4-(methyl thio)phenyl]-2-morpholino-propan-1-one (available under the trade designation IRGACURE 907 (BASF)); oligo[2-hydroxy-2-methyl-1-[4-(1-methylvinyl)phenyl]propanone] (available under the trade designation ESACURE KIP EM by Lamberti S.p.A. (Albizzate, ITALY); and bis(2,4,6-trimethylbenzoyl)-phenylphosphineoxide (available under the trade designation IRGACURE 819 (BASF Corporation)). Other suitable initiators include those disclosed in, for example, issued U.S. Pat. No. 5,545,676 (Palazzotto, et al.).

The photoinitiator or photoinitiators may represent at least about 0.05, at least about 0.1, at least about 0.2, at least 0.3, or at least about 0.5 weight percent of the phase in which it is soluble. Further, the photoinitiator or photoinitiators may represent up to about 10, up to about 8, up to about 5, up to about 2.5, or up to about 1 weight percent of the phase in which it is soluble.

Lower amounts of photoinitiator allow light to better penetrate the emulsion, which can provide for polymerization deeper into the foam layer. However, if polymerization is done in an oxygen-containing environment, there must be enough initiator to initiate the polymerization and overcome oxygen inhibition.

Thermal initiators can be used instead of, or in addition to, photoinitiators in the emulsion systems of the present invention. Useful thermal initiators include, e.g., azo compounds, peroxides, dialkyl and diacyl peroxides, hydroperoxides, peroxydicarbonates, peroxyketals, peroxy esters, peroxycarboxylates, potassium persulfate, t-butyl peroxyisobutyrate, and 2,2'-azobisisobutyronitrile, 2,2'-azobis(2,4-dimethylpentane nitrile), and other redox-type initiators. The thermal initiator could be present in either the MQ-resin or silicone fluid phase, and can be included independently of the photoinitiator (in systems meant for thermal polymerization only).

Alternatively or in addition to the initiators, catalysts can also be beneficial in accelerating the polymerization reaction of the foam. One example of such a catalyst is 3-aminopropyltriethoxysilane (APTES), available from Sigma-Aldrich, St. Louis, Mo. APTES reacts with silaceous species to create aminopropyl substituents. Preferably, the APTES is mixed with the MQ resin when it is desired to accelerate the polymerization reaction. In some embodiments, APTES is used to achieve room temperature polymerization of the emulsion without need for an initiator.

In some embodiments, the catalyst is present in an amount of at least about 0.0001 percent, at least about 0.005 percent, or at least about 0.01 percent of the overall silicone emulsion by weight. Moreover, the catalyst can be present in an amount of up to about 5 percent, up to about 0.5 percent, or up to about 0.1 percent of the overall silicone emulsion by weight.

Since it is also possible for silicone foams to be polymerized by electron beam exposure, however, such catalysts or initiators are not required. Exemplary silicone foam emulsions and silicone foam articles are substantially free of any catalysts or initiators.

Fillers and Additives

Although not necessary, the foamed articles herein optionally contain one or more fillers or other additives. Advantageously, such additives could assist in tailoring the stiffness of the foam or provide enhanced friability, toughness, and/or strength. Certain fillers, such as rigid and expandable microspheres, are foaming agents in their own right and, in some embodiments, could be blended with the provided foamed articles to further decrease foam density. This blending step could occur, for example, prior to polymerizing the silicone foam.

In some embodiments, the foam includes glass bubbles. Glass bubbles are hollow, rigid microspheres with thin glass walls and typically have an average density ranging from 0.1 to 0.5 grams per cubic centimeter with an average diameter ranging from 5 to 250 micrometers. Preferably, the glass bubbles are uniformly dispersed throughout the foam, although this need not be required. Useful glass bubbles include glass bubbles available from 3M Company (St. Paul, Minn.) under trade designation "3M SCOTCHILITE GLASS BUBBLES" (e.g. grades K1, K15, S15, S22, K20, K25, S32, K37, S38HS, K46, A16/500, A20/1000, and D32/4500); Potters Industries Inc. (Malvern, Pa.) under the trade designation "Q-CELL HOLLOW SPHERES" (e.g. grades 30, 6014, 6019, 6028, 6036, 6042, 6048, 5019, 5023, and 5028); and Silbrico Corp. (Hodgkins, Ill.) under the trade designation "SIL-CELL" (e.g. grads SIL 35/34, SIL-32, SIL-42, and SIL-43). The inclusion of glass bubbles into a silicone matrix is described in U.S. Pat. No. 6,746,761 (Janoff) and U.S. Pat. No. 6,892,817 (Janoff).

The foam articles described herein optionally include expandable microspheres, characterized by a polymeric shell surrounding a core material capable of substantially increasing in volume. Exemplary microspheres have an acrylonitrile polymeric shell, with a core material such as, for example, propane, butane, pentane, isobutene, neopentane, or a combination thereof. Upon heating the microsphere to a suitable temperature, the shell softens and core material expands into an inflated polymeric bubble. Upon cooling, the shell rehardens and resists collapse, thus maintaining the enlarged size of the microsphere. Commercially-available expandable microspheres include microspheres available from Henkel AG & Co. (Düsseldorf, GERMANY) under the trade designation "MICROPEARL" (e.g. grades F30, F80, and F100) and microspheres market by Akzonobel under the trade name EXPANCEL (e.g., "Expancel 551", "Expancel 461", and "Expancel 091").

In some embodiments, the provided foams are substantially free of any microspheres.

Other particulate fillers can also be added to increase the strength or toughness of the foam material. These particulate fillers include, for example, silica, zirconium oxide, titanium dioxide, ground quartz, aluminum oxides, aluminosilicates, organic waxes, zinc oxide, magnesium oxide, salts of aliphatic carboxylic acids, reaction products of isocyanates, alkyl amides, and combinations thereof.

Finally, the silicone foam material could include any of a number of non-particulate additives. Other known additives useful for the foam include, for example, tackifiers, plasticizers, dyes, flame retardants, rheology modifiers, and surfactants.

Methods of Making

Figure 2:
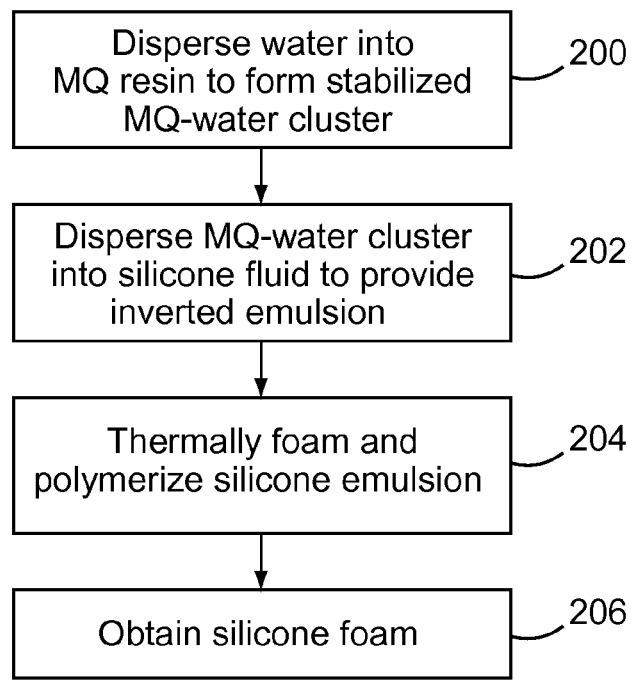
FIG. 2 is a block diagram showing steps used to make one exemplary embodiment of the invention.

FIG. 2 is a block diagram showing steps in a representative method of making a silicone foam. Block 200 shows an initial step of dispersing water into an MQ resin to form a stabilized MQ-water cluster. This can be accomplished by adding a suitable amount of water to a quantity of MQ resin powder and agitating the solid-liquid mixture to mechanically break down the water droplets. Such agitation can be achieved using one or more methods including, but not limited to, high speed mixing, blending, stirring, shaking, shearing, and ultrasonic mixing. If desired, the particle size of the MQ resin can be adjusted to increase or decrease the surface area along which the water becomes incorporated into the MQ resin.

It was surprisingly found that MQ resin is capable of associating a significant amount of water to form a stable MQ resin/water powder cluster (or "MQ-water cluster"). The amount of water relative to the amount of MQ resin can be determined in part on the desired density of the resulting foam material. In some embodiments, the quantity of water in the silicate MQ resin is at least about 70 percent, at least about 60 percent, at least about 50 percent, at least about 40 percent, at least about 30 percent, at least about 20 percent, at least about 10 percent, at least about 5 percent, at least about 1 percent, or at least about 0.5 percent of the overall weight of the MQ-water cluster. In some embodiments, the quantity of water in the silicate MQ resin is up to about 0.5 percent, up to about 5 percent, up to about 10 percent, up to about 20 percent, up to about 30 percent, up to about 40 percent, up to about 50 percent, up to about 60 percent, or up to about 70 percent. Optionally, the MQ resin absorbs a sufficient amount of water to provide a MQ-water cluster that is in a saturated state. In this saturated state, no further amount of water can be added to the MQ-water cluster without inducing macroscopic phase separation of water from the MQ-water cluster, despite repeated mechanical agitation.

By mechanically stirring, shearing, or shaking the water/MQ resin mixture, the water droplets were observed to break down into progressively smaller and smaller droplets, until they completely disappeared to the naked eye. The resulting MQ-water cluster was observed as a stabilized phase having the characteristics of a solid powder but containing a substantial amount of liquid water. The presence of a "stable" phase can be visually evidenced by the MQ-water cluster not significantly reverting to macroscopically separated phases of water and MQ-cluster (or MQ resin). To obtain reproducible foam properties, it is preferable that the MQ-water cluster is stable at ambient conditions over a period of time that exceeds the time required to prepare a finished silicone foam. Ambient conditions represent an environment having a temperature of about 25 degrees Celsius (77 degrees Fahrenheit) and a pressure of about 101 kilopascals (14.7 pounds per square inch).

In some embodiments, the MQ-water cluster is stable when subjected to ambient conditions for at least about 1 hour, at least about 2 hours, at least about 4 hours, at least about 6 hours, at least about 12 hours, at least about 24 hours, at least about 2 days, at least about 5 days, at least about 1 week, at least about 2 weeks, or at least about 1 month.

Referring again to FIG. 2, Block 202 shows the step of dispersing the MQ-water cluster into a silicone fluid to provide a polymerizable precursor composition. Where the MQ-water cluster is in a solid particulate form, as here, the precursor composition tends to be an inverted emulsion. Such an emulsion can have, for example, a structure analogous to that of a stabilized water-in-oil emulsion, where the water phase (or aqueous phase) is discontinuous and the oil phase is continuous. As an alternative, however, the aqueous phase and oil phase could instead form a bi-continuous emulsion, in which both the water and oil phases are continuous.

In a preferred embodiment, the silicone fluid is present in an amount sufficient to provide a stable silicone emulsion, while also providing a suitable foam density. For example, the silicone fluid can represent at least about 99 percent, at least about 90 percent, at least about 80 percent, at least about 70 percent, at least about 60 percent, at least about 50 percent, at least about 40 percent, at least about 30 percent, or at least about 20 percent of the overall composition by weight. Likewise, the silicone fluid can represent up to about 20 percent, up to about 30 percent, up to about 40 percent, up to about 50 percent, up to about 60 percent, up to about 70 percent, up to about 80 percent, up to about 90 percent, or up to about 99 percent of the overall composition by weight.

The silicone fluid is sufficiently flowable to create a stabilized inverted emulsion with the MQ-water cluster. As noted earlier, particularly useful silicone fluids include polydimethylsiloxane oligomers that are partially or fully soluble in MQ resin.

Although not required, a catalyst can also be included in the silicone fluid to enable subsequent polymerization of the precursor composition by applying heat or by irradiating with light having a suitable range of wavelengths. For the catalyst to be effective in facilitating the polymerization reaction, it is generally soluble in the silicone fluid.

In some embodiments, the precursor composition is stable when subjected to ambient conditions for at least about 1 hour, at least about 2 hours, at least about 4 hours, at least about 6 hours, at least about 12 hours, at least about 24 hours, at least about 2 days, at least about 5 days, at least about 1 week, at least about 2 weeks, or at least about 1 month.

Block 204 shows the step of thermally foaming and polymerizing the precursor composition to obtain the finished silicone foam (Block 206). The struts of the silicone foam comprise a silicone polymer that derives from a bi-continuous mixture of the silicone resin and the MQ-resin. In this exemplary method, the precursor composition is the inverted silicone emulsion obtained in the step of Block 202.

Figure 3:
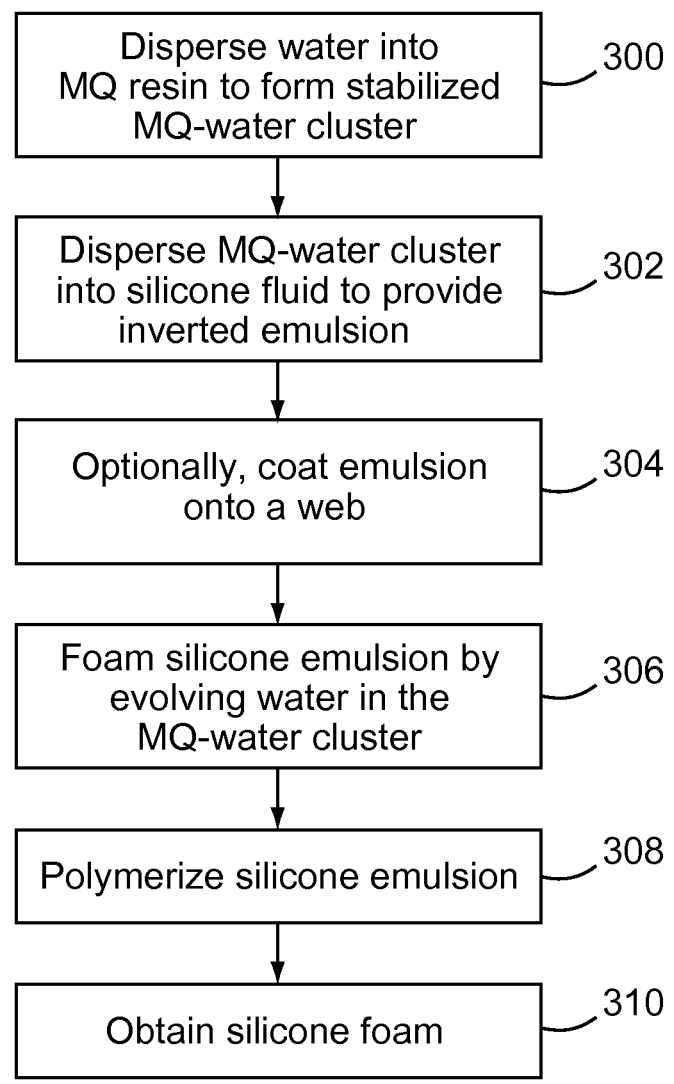
FIG. 3 is a block diagram showing steps used to make another exemplary embodiment of the invention.

FIG. 3 shows a variation in the method of making described in FIG. 2. Like in Blocks 200, 202, a suitable amount of water can be dispersed into the MQ resin to a form a stabilized cluster (Block 300), and then the MQ-cluster can be dispersed into a silicone fluid to form an inverted emulsion (Block 302). As shown in Block 304, the inverted emulsion can then be coated onto a supporting web.

As used herein, a "web" refers to a suitable support film that acts as a substrate for the polymerizable precursor composition. The web can be static or dynamic. If dynamic, the coating of the precursor composition as a layer on a support film can facilitate the continuous (e.g. roll to roll) manufacturing of silicone foam. If desired, a support film (e.g., polyester terephthalate support film) is in direct contact with the composition prior to foaming or polymerization. In other embodiments, the composition is disposed on a liner (e.g., a fluorosilicone release liner) interposed between the web and the composition. In still other embodiments, a layer of the precursor composition with a liner disposed on both sides ("closed face") may be attached to the support film and conveyed at a fixed speed of, for example, about 6.1 meters per minute (20 feet per minute).

Block 306 shows the step of foaming the silicone emulsion. This foaming step takes place, for example, by evolving some or all of the water located in the interstices of the MQ-water cluster. As the water transforms into water vapor, tiny microscopic gas bubbles are formed in the emulsion which can provide a multiplicity of voids in the finished silicone foam. The gas bubbles can be induced by manipulating either the temperature or pressure of the foam.

Subjecting the silicone emulsion to elevated temperatures can be an effective way to foam the emulsion. This can be accomplished by heating the foam above slightly above the boiling point of water, for example above about 100° C., above about 105° C., above about 110° C., above about 120° C., or above about 130° C. Depending on the ambient air pressure above the emulsion, higher or lower temperatures may be needed. The silicone emulsion can also be foamed by subjecting the emulsion to a partial vacuum. In some embodiments, some combination of temperature and pressure is used to induce foaming of the composition.

After the foaming the silicone emulsion by evolving some or all of the water in the MQ-water cluster, the foamed silicone emulsion is then polymerized as shown in Block 306. Polymerization is the chemical reaction by which the oligomeric or monomeric components of the emulsion become crosslinked together to form a silicone polymer. This silicone polymer is essentially a molecular network and can display elastomeric properties. Methods of polymerization include reactions that are thermally-induced and those induced by irradiation.

In some embodiments, the web-coated emulsion is irradiated by electron beam ("E-beam") irradiation to polymerize the silicone foam. E-beams induce polymerization by generating free radicals, ion radicals and other activated species, which combine to form long-chain polymers. Their use can be advantageous because it allows for polymerization of foams that are substantially free of additional initiators or catalysts. As used herein, a composition is "substantially free of catalysts and initiators" if the composition does not include an 'effective amount' of a catalyst or initiator. Advantageously, this method offers the potential to prepare clean, non-toxic foams that can be suitable for applications that are non-irritating to the skin. Such foams could be useful in wound dressings and other medical applications. The freedom from additional initiators or catalysts also avoids the possibility of introducing an undesirable color cast to the foam material as a result of one or more of these chemicals.

Procedures employed for E-beam polymerization are well-known, although the polymerization settings can be equipment-specific. One skilled in the art can define a dose calibration model for the equipment used. Various commercially available electron beam generating equipment are available. In some embodiments, the irradiation can be performed on a Model CB-300 electron beam generating apparatus (available from Energy Sciences, Inc. (Wilmington, Mass.)).

In other embodiments, polymerization of the web-coated emulsion is achieved by exposure to gamma rays. As an advantage, polymerization by gamma ray irradiation can provide for thicker foams, since gamma rays are capable of penetrating deeper into the emulsion than E-beams. Commercially available gamma irradiation equipment include those used, for example, in sterilization applications for medical products.

A combination of E-beam polymerization and gamma ray polymerization can be used to polymerize the emulsion. For example, in some embodiments, the coating can be partially polymerized by exposure to E-beam irradiation and further polymerized by gamma ray irradiation. Further details concerning E-beam and gamma ray polymerization can be found in WO2010/056541 (Liu, et al.) and WO2010/056543 (Liu, et al).

In some embodiments, a sample of unpolymerized material may be applied to one liner, with no liner on the opposite surface ("open face"). The unpolymerized material may be exposed to E-beam irradiation from one side through the release liner. For making a single layer laminating adhesive type tape, a single pass through the electron beam may be sufficient. Thicker samples may exhibit a polymerization gradient through the cross section of the tape, so it may be desirable in these cases to expose the unpolymerized material to electron beam radiation from both sides. Further aspects of electron beam polymerization are described in, for example, U.S. Patent Publication No. 2011/0206923 (Liu, et al.).

An alternative way to polymerize the silicone emulsion is by thermal means using a suitable initiator, catalyst, or both, as described above under the section "INITIATORS AND CATALYSTS." Since the foaming step can also be achieved by subjecting the silicone emulsion to elevated temperatures, at least some of the polymerization of the silicone emulsion can occur simultaneously with the foaming of the silicone emulsion. If these processes occur simultaneously, the polymerization reaction can occur at a sufficiently slow rate that the emulsion is substantially foamed prior to the silicone polymer reaching its gel point (i.e. the state where a chemically crosslinked system transforms from a viscous liquid into an dimensionally stable material). Alternatively, the polymerization could occur at a faster rate than the foaming process. If so, some or all of the foaming may take place after reaching the gel point, and result in stretching the silicone struts of the foam as the water evolves from the emulsion.

In some embodiments, the initiator or catalyst is included as a component of the silicone fluid or the MQ-water cluster prior to formation of the silicone emulsion. Preferably, the initiator or catalyst is substantially soluble in other components of the silicone fluid (e.g. polydimethylsiloxane, silicone polyoxamides, and co-solvents) or the MQ water cluster. One type of thermally-induced polymerization involves the combination of silicone prepolymers that contain silanol (—OH) groups. Crosslinking then proceeds through silanol condensation to form siloxane crosslinks and water.

An addition reaction could also be used to polymerize the silicone polymer of the finished foamed article. Addition reaction polymerizations take place when oligomers or monomers react together without requiring the elimination of other molecules. These reactions are typically initiated at elevated temperatures and involve a suitable catalyst, such as platinum metal. Since elevated temperatures are generally used to both actuate crosslinking of the silicone polymer as well as evolve the water, polymerization can take place simultaneously with the foaming process. In a preferred embodiment, the silicone emulsion is substantially foamed by the time sufficient crosslinking has occurred to provide a stable foam microstructure.

Polymerization of the silicone emulsion provides the finished silicone foam, as shown in Block 310. Optionally, the residual water in the foam can be removed by baking in an oven to provide a dried, porous silicone foam.

Figure 4:
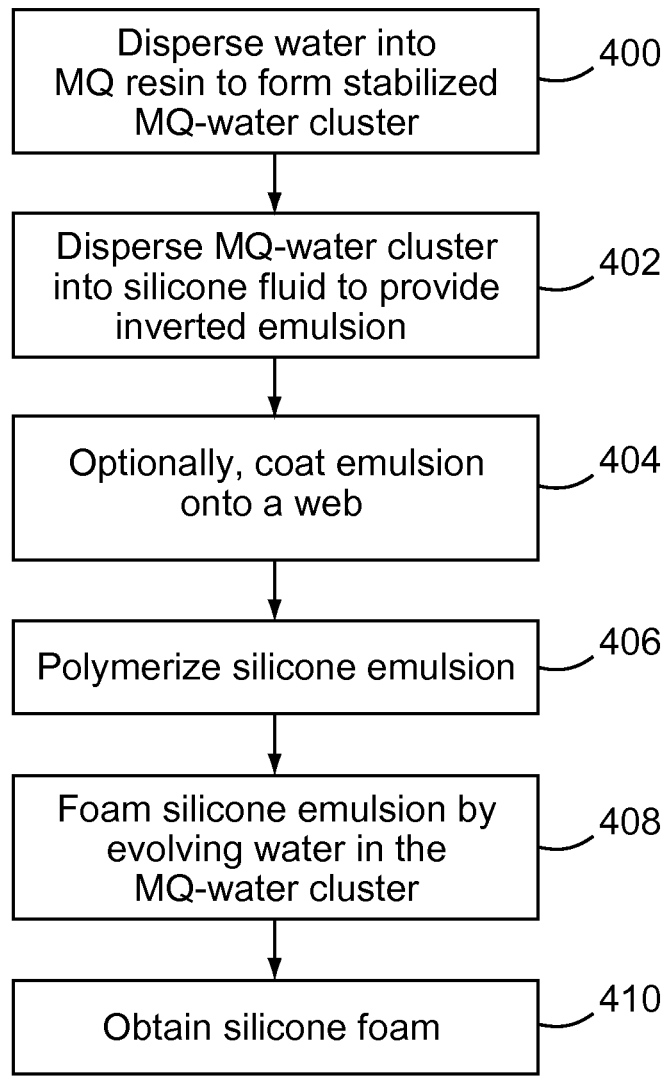
FIG. 4 is a block diagram showing steps used to make still another exemplary embodiment of the invention.

FIG. 4 shows an alternative method having substantially similar steps to those used in the method of FIG. 3. Like the method just described, water is dispersed into the MQ resin (Block 400), the MQ-water cluster is dispersed into a silicone fluid to provide an inverted silicone emulsion (Block 402), and the emulsion optionally coated onto a web (Block 404). In this exemplary method, the steps of polymerizing the silicone emulsion (Block 406) and foaming the silicone emulsion (Block 408) are reversed, such that the silicone emulsion is substantially polymerized prior to being foamed. During the foaming step of Block 408, the silicone matrix expands to an overall volume at which expansion forces due to the transformation of water into water vapor are counterbalanced by compressive forces resulting from the elasticity of the polymerized silicone fluid. Evacuating the water vapor from the voids embedded in the silicone polymer provides the finished silicone foam (Block 410).

In exemplary embodiments, the polymerization of the emulsion in Block 406 provides a degree of crosslinking that is sufficient to provide structural integrity of the silicone material, while also providing a capacity for at least some inelastic deformation of the silicone when the evolving the water from the MQ-water cluster in Block 410. The inelasticity of the silicone as it stretches allows the expanded cellular microstructure of the foam to be preserved. By consequence of the polymerized structure experiencing a combination of both elastic and inelastic deformation during the foaming process of Block 408, the ultimate volume and density of the foam can reflect some degree of elastic recovery of the silicone struts of the foam as the water vapor is removed from the polymerized silicone foam.

In some embodiments, the overall volume of the finished silicone foam when the polymerization step (Block 406) occurs prior to the foaming step (Block 408) is somewhat less compared with the overall volume of the finished silicone foam when the foaming step (Block 408) occurs prior to the polymerization step (Block 406). The density of the former silicone foam is thus higher than that of the latter.

Variants of the above methods are also possible. For example, the silicone fluid may further include a co-solvent. The co-solvent preferably mixes with the remaining components of the silicone fluid to form a homogenous phase. The co-solvent can be selected from any of a number of solvents that dissolve the silicone components but do not prevent the formation of a stable silicone emulsion with the MQ-water cluster. The addition of a co-solvent is particularly beneficial when the silicone fluid includes one or more components that are highly viscous or even solid-like under ambient conditions. For example, the silicone fluid may include silicone block copolymers such as a partially or fully co-polymerized silicone polyureas or polyoxamides, as described in U.S. Pat. No. 5,461,134 (Leir et al.), and U.S. Pat. No. 7,883,652 (Leir et al.), which are essentially solids in pure form but can be dissolved in a co-solvent such as toluene.

In an exemplary embodiment, the co-solvent can be present in the silicone fluid in an amount that represents at least about 25 percent, at least about 35 percent, at least about 40 percent, at least about 45 percent, at least about 50 percent, at least about 55 percent, at least about 60 percent, at least about 65 percent, or at least about at least about 70 percent by weight of the overall silicone fluid composition. Further, the co-solvent can be present in the silicone fluid in an amount that represents up to about 25 percent, up to about 35 percent, up to about 40 percent, up to about 45 percent, up to about 50 percent, up to about 55 percent, up to about 60 percent, up to about 65 percent, or up to about at least about 70 percent by weight of the overall silicone fluid composition.

After the co-solvent is mixed and incorporated into the silicone fluid, the MQ-water cluster can then be dispersed into the silicone fluid according to the above methods. The co-solvent can be evolved from the resulting silicone emulsion at the same time the water is evolved during the foaming step (Blocks 306, 408).

Figure 5:
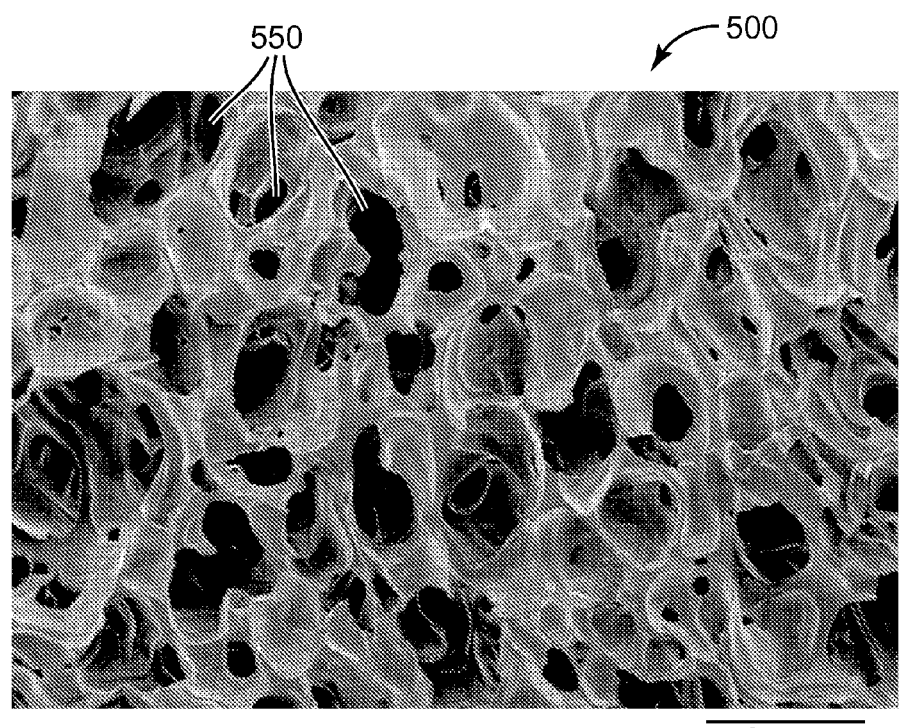
FIG. 5 is a micrograph of a silicone foam specimen made using the steps of FIG. 2.

FIG. 5 shows a scanning electron micrograph of an exemplary silicone foam material 500 prepared according to Example 10 (see Examples, below). As shown, the foam 500 has a multiplicity of cells 550 that are substantially interconnected, providing continuous pathways for gases and fluids to permeate through the bulk foam.

Figure 6:
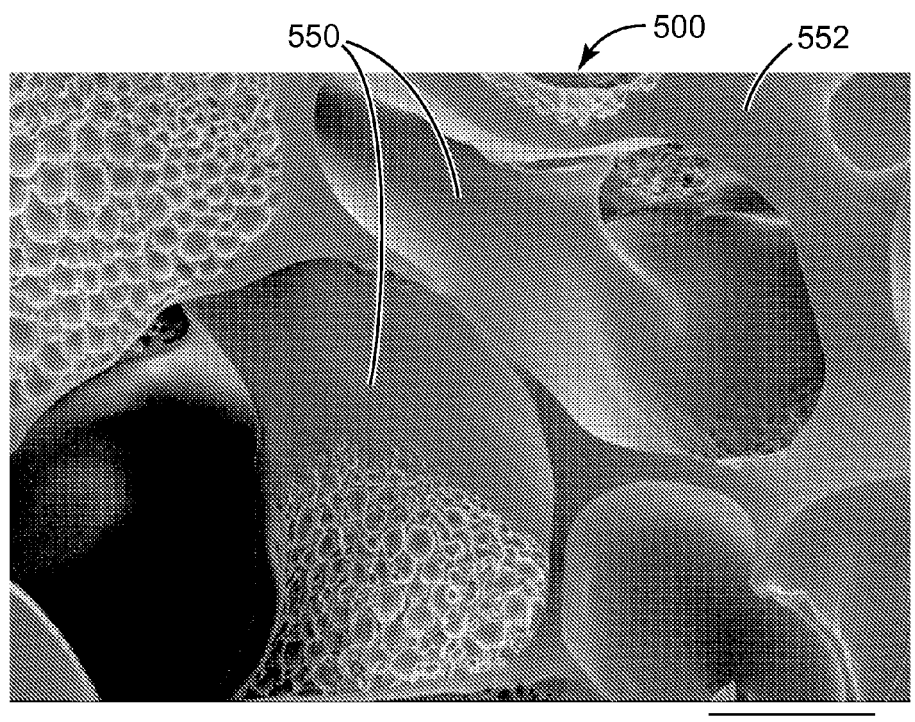
FIG. 6 is a micrograph of the silicone foam in FIG. 5 at higher magnification.

FIG. 6 shows an enlarged image of the silicone foam 500, showing the open cells 550 in greater detail. The cells 550 are separated by polymeric struts 552. Depending on the relative amount of water dispersed in the MQ-water cluster and the relative amount of MQ-water cluster dispersed in the silicone emulsion, it is possible to tailor the thickness of the polymeric struts 552. The geometry of the struts 552 can influence mechanical characteristics of the overall foam 500, including for example strength, friability, and pressure required to achieve a compression deflection of 25%.

In many applications, it is preferred that the gas bubbles have a controlled average size and size distribution. In some embodiments, the voids have an average size of at least about 20 micrometer, at least about 50 micrometers, at least about 100 micrometers, at least about 500 micrometers, or at least about 2000 micrometers. Likewise, the voids can have an average size of up to about 100 micrometers, up to about 500 micrometers, up to about 1000 micrometers, up to about 2000 micrometers, or up to about 5000 micrometers.

The density of the finished foam can depend in part on the composition of the MQ-water cluster and the silicone emulsion. Applying the methods set out in FIGS. 2-4, low-density silicone foams displaying densities of at least about 0.1 grams per cubic centimeter, at least about 0.15 grams per cubic centimeter, at least about 0.20 grams per cubic centimeter could be obtained. Such foams could display a foam density of up to about 0.4 grams per cubic centimeter, up to about 0.30 grams per cubic centimeter, or up to about 0.2 grams per cubic centimeter. On the upper end, foams displaying densities of at least about 0.5 grams per cubic centimeter, at least about 0.6 grams per cubic centimeter, or at least about 0.7 grams per cubic centimeter could be prepared. These foams could display densities of up to about 0.9 grams per cubic centimeter, up to about 0.85 grams per cubic centimeter, or up to about 0.7 grams per cubic centimeter.

Using the aforementioned methods, it is possible to prepare silicone foams and foamed articles where essentially all of the voids in the silicone foam are provided by evolving the water in the MQ-water cluster. Many advantages derive from using water located in the interstices of the MQ-water cluster as a physical blowing agent.

First, the provided foams have the potential for a high degree of biological compatibility. Water is non-toxic, and the use of water as a blowing agent obviates chemical blowing agents which can leave residual chemical byproducts in the foam. The silicone emulsion used to prepare the foam can be substantially free of any physical or chemical blowing agents other than water. As a result, the silicone foams thus formed can be of essentially 100 percent silicones containing only silicone and silicate moieties. Exemplary applications include wound dressings intended for extended contact with the skin. The absence of initiators, chemical blowing agents, and other potential irritants can alleviate the possibility of an adverse biological response. The provided foamed silicone materials could also be used in gentle-to-skin adhesives with inherent porosity and improved breathability.

Second, the provided methods for making silicone foams enables the foaming and polymerization of the silicone emulsion to be actuated independently of each other. By avoiding convolution of these steps, it is possible to obtain improved control of the foam characteristics. As previously described, this benefit could be achieved by foaming the silicone emulsion under controlled conditions and subsequently using E-beam irradiation to polymerize the foamed emulsion and fix its cellular microstructure.

Finally, the disclosed methods simplify the manufacturing process, and such foams can thus be prepared more cost effectively than conventional silicone foams. This can open the market to a broader range of applications for silicone foams, including high-strength bonding applications with a silicone foam core for use in high and low temperatures, bonding applications requiring resistance to ultraviolet radiation, acoustic barrier and absorber applications, transportation applications that demand low smoke generation, and foam sealants for solar panel applications.

EXAMPLES

Objects and advantages of this invention are further illustrated by the following examples. While particular materials and amounts thereof are provided herein, these should not be construed to unduly limit this invention. Unless otherwise noted, all parts and percentages are on a weight basis and all molecular weights are weight average molecular weight. Also unless otherwise noted, all solvents and reagents were obtained from Sigma-Aldrich Corp. in St. Louis, Mo.

Materials utilized for the examples are shown in Table 1.

TABLE 1

| Material | Description | Source |
|---|---|---|
| MQ Resin | TMS 803 resin | Wacker Chemie AG, Munchen, Germany |
| S51 | Silanol terminated PDMS, DMS-S51, MW 139,000 | Gelest, Morrisville, PA |
| S33 | Silanol terminated PDMS, DMS-S33, MW 43,500 | Gelest, Morrisville, PA |
| S35 | Silanol terminated PDMS, DMS-S35, MW 49,000 | Gelest, Morrisville, PA |
| APTES | 3-Aminopropyltriethoxysilane | Sigma-Aldrich, St. Louis, MO |
| SPOx | Silicone Polyoxamide, see U.S. Patent Publication No. 2011/0092638 | 3M Company, St. Paul, MN |
| D200 | 2-part thermal polymerization silicone system | Gelest, Morrisville, PA |
| F065 | 2-part thermal polymerization silicone system | Gelest, Morrisville, PA |

Test Methods
Foam Density

The foam density is determined by weighing a known volume of a foam sample. Density is the weight divided by volume.

Samples

Examples 1-6

In a container was mixed 15 g MQ resin and 30 g deionized water. This was mixed with a DAC400 FVZ Speed Mixer (FlackTek, Landrum, S.C.) for 1.2 minutes. The container was then shaken until the water droplets visually disappeared. This is the MQ Water Cluster.

A mixture of 58 g S33 siloxane and 11 g MQ resin was prepared. To this was added 1 g APTES and 45 g MQ Water Cluster. This was mixed by the Speed Mixer in a plastic cup for approximately 1.2 minutes, to form a stable emulsion (in these Examples, these emulsions were observed to be stable to 6 months under ambient conditions). The emulsion was then heated in a 110° C. oven for 24 hours to produce a foam. Foam density was measured at 0.27 g/mL. This was Example 1 (E-1).

Examples 2-6 were prepared in a similar fashion with the components listed in Table 2.

Examples 7-9

Examples 7-9 were prepared as per Example 1 with the additional steps of coating the silicone mixture on a fluorosilicone liner (C2S fluorosilicone PET liner, Loparex, Cary, N.C.) at 1 mm thickness, then E-beam polymerization of the coating at 6 Mrad and 300 keV. After polymerization, the coated silicone was foamed by heating for 20 minutes at 110° C. Compositions are shown in Table 2.

Example 10

To 50 g MQ resin was added 50 g deionized water. This was shaken by hand until the water droplets visually disappeared. This is the MQ Water Cluster.

SPOx siloxane (100 g) was dissolved in 99 g toluene. In a beaker was mixed 25 g of the dissolved SPOx and 25 g of the MQ Water Cluster. This was mixed in the Speed Mixer for approximately at 2500 rpm for 1.2 minutes, then heated at 110 C for 24 hours to produce a foam. The composition is shown in Table 2.

Example 11

To 50 g MQ resin was added 50 g deionized water. This was shaken by hand until the water droplets visually disappeared. This is the MQ Water Cluster.

A twin-screw Brabender extruder was used to mix 20 g SPOx and 10 g of the MQ Water Cluster at 135° C. During mixing, volume expansion caused the mixture to exit the extruder as a foam. The composition is shown in Table 2.

Example 12

To 15 g MQ resin was added 15 g deionized water. This was mixed by a DAC400 FVZ Speed Mixer (FlackTek Inc, Landrum, S.C.) for 1.2 minutes, then shaken until water droplets visually disappeared. This is the MQ Water Cluster.

To 33 g D200 (30 g part A, 3 g part B) was added 30 g MQ Water Cluster. This was mixed with a DAC400 FVZ for 1.2 minutes, then heated at 110° C. for 24 hours to produce a foam. The composition is shown in Table 2.

Example 13

To 10 g MQ resin was added 10 g deionized water. This was mixed by a DAC400 FVZ Speed Mixer (FlackTek Inc, Landrum, S.C.) for 1.2 minutes, then shaken until water droplets visually disappeared. This is the MQ Water Cluster.

To 20 g F065 was added 20 g of MQ Water Cluster. This was mixed with a DAC400 FVZ for 1.2 minutes, then heated at 110° C. for 24 hours to produce a foam. The composition is shown in Table 2.

TABLE 2

Silicone Foam Example Composition

| Example | MQ Water Cluster Preparation | | | Foam | |
| | MQ Resin (g) | Water (g) | Silicone | MQ Resin (g) | Density (g/mL) |
| --- | --- | --- | --- | --- | --- |
| E-1 | 15 | 30 | S33, 58 g | 11 | 0.27 |
| E-2 | 15 | 15 | S33, 50 g | 10 | 0.24 |
| E-3 | 15 | 16 | S51, 50 g | 10 | 0.75 |
| E-4 | 15 | 16 | S51, 52 g | 0 | 0.49 |
| E-5 | 25 | 16 | S51, 52 g | 0 | 0.50 |
| E-6 | 15 | 16 | S33, 50 g | 0 | —[a] |
| E-7 | 27 | 20 | S51, 51 g | 18 | — |
| E-8 | 41 | 20 | S51, 50 g | 23 | — |
| E-9 | 61 | 21 | S51, 52 g | 29 | — |
| E-10 | 50 | 50 | SPOx, 100 g | 25 | — |
| E-11 | 50 | 50 | SPOx, 20 g | 10 | — |
| E-12 | 15 | 15 | D200, 33 g | 0 | — |
| E-13 | 10 | 10 | F065, 20 g | 0 | — |

[a]not measured

Comparative 1

To 50 g S33 siloxane was added 17 g water. This was mixed with the Speed Mixer at 2500 rpm for 1.2 minutes. A milky, unstable mixture was produced. Water droplets were visible separating from the silicone fluid after 1 hour.

Comparative 2

To 50 g S33 siloxane was added 17 g water. This was mixed with the Speed Mixer at 2500 rpm for 1.2 minutes. To this mixture was added 30 g MQ and 1 g APTES. This mixture was heated at 110 C. Water was observed separating from the silicone fluid prior to and during heating.

Comparative 3

To 50 g S33 siloxane was added 15 g MQ resin. This was mixed with the Speed Mixer at 2500 rpm for 1.2 minutes, then allowed to stand for 1 hour. To this was added 15 g water, then mixed by the Speed Mixer at 2500 rpm for 1.2 minutes. The water could not be incorporated into the siloxane/MQ mixture.

Particular embodiments A through AY are further contemplated and disclosed as follows:

A. A silicone foam comprising: a crosslinked silicone network of polysiloxane and a silicate resin, the silicone network being substantially free of any chemical blowing agents or byproducts thereof; and a multiplicity of voids embedded in the silicone network to provide a cellular structure.

B. The foam of embodiment A, wherein the silicate resin comprises a three-dimensional silicate network that includes M and Q-units having the chemical structures shown below:

$$R''-\underset{\underset{R'''}{|}}{\overset{\overset{R'}{|}}{Si}}-O_{1/2}- \quad\quad -O_{1/2}-\underset{\underset{O_{1/2}}{|}}{\overset{\overset{O_{1/2}}{|}}{Si}}-O_{1/2}-$$

(M-unit) (Q-unit)

wherein each of R', R", and $R_3'''$ is either a methyl or hydroxyl group, at least one of R', R", and $R_3'''$ being a hydroxyl group.

C. The foam of embodiment B, wherein the M and Q-units are present in a stoichiometric ratio of at least about 1 to 20.

D. The foam of embodiment C, wherein the M and Q-units are present in a stoichiometric ratio of at least about 1 to 3.

E. The foam of embodiment D, wherein the M and Q-units are present in a stoichiometric ratio of at least about 3 to 5.

F. The foam of embodiment A, wherein the MQ resin is a tackifying polymer.

G. The foam of embodiment A, wherein the foam has a density of up to about 0.85 grams per cubic centimeter.

H. The foam of embodiment G, wherein the foam has a density of up to about 0.4 grams per cubic centimeter.

I. The foam of embodiment H, wherein the foam has a density of up to about 0.2 grams per cubic centimeter.

J. The foam of embodiment A, further comprising one or more particulate fillers dispersed in the silicone polymer and selected from the group consisting of: silica, zirconium oxide, titanium dioxide, ground quartz, aluminum oxides, aluminosilicates, organic waxes, zinc oxide, magnesium oxide, salts of aliphatic carboxylic acids, reaction products of isocyanates, and alkyl amides.

K. The foam of embodiment A, wherein the foam is substantially free of microspheres.

L. The foam of embodiment A, wherein the foam is substantially free of any polymerization catalysts.

M. The foam of embodiment A, wherein the cellular structure comprises an open-celled microstructure.

N. A polymerizable silicone composition comprising: an MQ-water cluster comprised of a silicate MQ resin and a quantity of water dispersed in the silicate MQ resin ranging from about 1 percent to about 99 percent of the overall weight of the MQ-water cluster; and a silicone fluid, wherein the MQ-water cluster and silicone fluid collectively provide a inverted emulsion having a continuous and a discontinuous phase, the continuous phase comprising the silicone fluid and the discontinuous phase comprising the MQ-water cluster.

O. The composition of embodiment N, wherein the water is present in an amount ranging from about 2 percent to about 90 percent of the MQ-water cluster by weight.

P. The composition of embodiment O, wherein the water is present in an amount ranging from about 5 percent to about 80 percent of the MQ-water cluster by weight.

Q. The composition of embodiment N, where the phase is stable at ambient temperatures and pressures over a period of at least 1 hour.

R. The composition of embodiment Q, wherein the phase is stable at ambient temperature and pressure over a period of at least 4 hours.

S. The composition of embodiment R, wherein the phase is stable at ambient temperature and pressure over a period of at least 96 hours.

T. The composition of embodiment N, wherein the silicone fluid comprises a polydimethylsiloxane oligomer.

U. The composition of embodiment N, wherein the silicone fluid comprises an at least partially polymerized silicone polyoxamide.

V. The composition of embodiment U, wherein the silicone fluid further comprises a co-solvent homogenously mixed with the silicone polyoxamide.

W. The composition of embodiment N, wherein the silicone fluid is present in an amount ranging from about 5 percent to about 95 percent of the overall composition by weight.

X. The composition of embodiment W, wherein the silicone fluid is present in an amount ranging from about 10 percent to about 85 percent of the overall composition by weight.

Y. The composition of embodiment X, wherein the silicone fluid is present in an amount ranging about 30 percent to about 70 percent of the overall composition by weight.

Z. The composition of embodiment N, further comprising a catalyst for polymerizing the emulsion.

AA. The composition of embodiment Z, wherein the catalyst comprises 3-aminopropyltriethoxysilane.

AB. The composition of embodiment AA, wherein the catalyst is present in an amount ranging from about 0.0001 percent to about 2 percent of the overall composition by weight.

AC. A foamed silicone article provided by polymerizing the composition of any of embodiments N-Z.

AD. A method of making a silicone foam comprising: dispersing a quantity of water into a silicate MQ resin to provide an MQ-water cluster; dispersing the stabilized MQ-water cluster into a silicone fluid to obtain an inverted silicone emulsion having the MQ-water cluster as a discontinuous phase and the silicone fluid as a continuous phase; and foaming the silicone emulsion by evolving the water in the MQ-water cluster to provide a cellular structure.

AE. The method of embodiment AD, further comprising polymerizing the silicone emulsion.

AF. The method of embodiment AD or AE, wherein the silicone fluid comprises a polydimethylsiloxane oligomer.

AG. The method of embodiment AF, wherein the polydimethylsiloxane oligomer is silanol terminated.

AH. The method of embodiment AD or AE, wherein the silicone fluid comprises a silicone resin that is at least partially polymerized.

AI. The method of embodiment AH, wherein the silicone fluid further comprises a co-solvent homogenously mixed with the silicone resin, wherein foaming the silicone emulsion further comprises evolving the co-solvent.

AJ. The method of embodiment AH, wherein the co-solvent comprises toluene.

AK. The method of any one of embodiments AD-AJ, wherein essentially all of the voids in the silicone emulsion are provided by evolving the water in the MQ-water cluster.

AL. The method of any one of embodiments AD-AK, further comprising adding a catalyst to the silicone fluid to facilitate polymerization of the silicone emulsion.

AM. The method of embodiment AL, wherein the catalyst comprises 3-aminopropyltriethoxysilane.

AN. The method of embodiment AE, wherein the polymerizing of the silicone emulsion and foaming of the silicone emulsion are actuated separately.

AO. The method of embodiment AN, wherein the silicone emulsion is substantially polymerized prior to foaming the silicone emulsion.

AP. The method of embodiment AN, wherein at least some of the polymerization of the silicone emulsion occurs simultaneously with the foaming of the silicone emulsion.

AQ. The method of any one of embodiments AD-AP, wherein evolving the water comprises subjecting the silicone emulsion to elevated temperatures.

AR. The method of any one of embodiments AD-AQ, wherein evolving the water comprises subjecting the silicone emulsion to a partial vacuum.

AS. The method of embodiment AE, AN, AO, or AP, wherein polymerizing the silicone emulsion comprises irradiating the silicone emulsion.

AT. The method of embodiment AS, further comprising adding a photoinitiator to the silicone fluid, wherein irradiating the silicone emulsion comprises irradiating the silicone emulsion with ultraviolet light.

AU. The method of embodiment AS, wherein irradiating the silicone emulsion comprises electron beam polymerization.

AV. The method of embodiment AE, AN, AO, or AP, wherein polymerizing the silicone emulsion comprises condensation polymerization of the silicone emulsion.

AW. The method of any of embodiments AD-AV, wherein the silicone foam has an open-celled microstructure.

AX. The method of any of embodiments AD-AW, wherein the silicone emulsion is substantially free of any physical or chemical blowing agents other than water.

AY. A foamed silicone article made according to the method of any one of embodiments AD-AX.

All of the patents and patent applications mentioned above are hereby expressly incorporated into the present disclosure. The foregoing invention has been described in some detail by way of illustration and example for purposes of clarity and understanding. However, various alternatives, modifications, and equivalents may be used and the above description should not be taken as limiting in the scope of the invention which is defined by the following claims and their equivalents.

What is claimed is:

1. A polymerizable silicone composition comprising:
an MQ-water cluster comprised of a silicate MQ resin and a quantity of water dispersed in the silicate MQ resin ranging from about 1 percent to about 99 percent of the overall weight of the MQ-water cluster; and
a silicone fluid,
wherein the MQ-water cluster and silicone fluid collectively provide an inverted emulsion having a continuous and a discontinuous phase, the continuous phase comprising the silicone fluid and the discontinuous phase comprising the MQ-water cluster.

2. The composition of claim 1, wherein the silicone fluid comprises a polydimethylsiloxane oligomer.

3. The composition of claim 1, wherein the silicone fluid comprises an at least partially polymerized silicone polyoxamide.

4. The composition of claim 1, further comprising a catalyst for polymerizing the emulsion, the catalyst comprising 3-aminopropyltriethoxysilane.

5. The composition of claim 1, wherein the silicate MQ resin comprises a three-dimensional silicate network that includes M and Q-units having the chemical structures shown below:

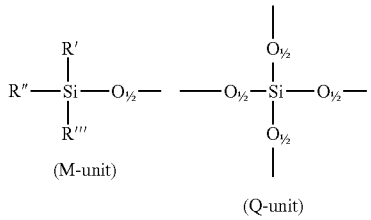

(M-unit) (Q-unit)

wherein each of R', R", and $R_3'''$ is either a methyl or hydroxyl group, at least one of R', R", and $R_3'''$ being a hydroxyl group.

6. A foamed silicone article provided by polymerizing the composition of claim 1.

7. A method of making a silicone foam comprising:
dispersing a quantity of water into a silicate MQ resin to provide an MQ-water cluster;
dispersing the stabilized MQ-water cluster into a silicone fluid to obtain an inverted silicone emulsion having the MQ-water cluster as a discontinuous phase and the silicone fluid as a continuous phase; and
foaming the silicone emulsion by evolving the water in the MQ-water cluster to provide a cellular structure.

8. The method of claim 7, further comprising polymerizing the silicone emulsion.

9. The method of claim 8, wherein the polymerizing of the silicone emulsion and foaming of the silicone emulsion are actuated separately.

10. The method of claim 9, wherein the silicone emulsion is substantially polymerized prior to foaming the silicone emulsion.

11. The method of claim 9, wherein at least some of the polymerization of the silicone emulsion occurs simultaneously with the foaming of the silicone emulsion.

12. The method of claim 7, wherein the silicone fluid comprises a silicone resin that is at least partially polymerized.

13. The method of claim 12, wherein the silicone fluid further comprises a co-solvent homogenously mixed with the silicone resin, wherein foaming the silicone emulsion further comprises evolving the co-solvent.

14. The method of claim 7, wherein essentially all of the voids in the silicone emulsion are provided by evolving the water in the MQ-water cluster.

15. The method of claim 7, wherein the silicate MQ resin comprises a three-dimensional silicate network that includes M and Q-units having the chemical structures shown below:

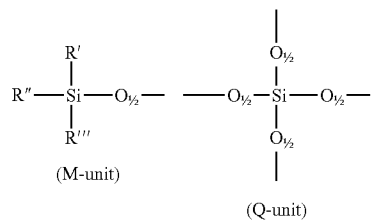

(M-unit) (Q-unit)

wherein each of R', R", and $R_3'''$ is either a methyl or hydroxyl group, at least one of R', R", and $R_3'''$ being a hydroxyl group.

* * * * *

UNITED STATES PATENT AND TRADEMARK OFFICE
CERTIFICATE OF CORRECTION

PATENT NO. : 9,540,494 B2
APPLICATION NO. : 14/424473
DATED : January 10, 2017
INVENTOR(S) : Junkang Liu et al.

Page 1 of 1

It is certified that error appears in the above-identified patent and that said Letters Patent is hereby corrected as shown below:

In the Specification

Column 4

Line 5-12 (approx.), after " 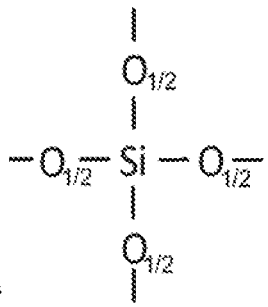 " insert -- , --.

Column 5
Line 53, delete "acylphospine" and insert -- acylphosphine --, therefor.

Column 7
Line 4, delete "SCOTCHILITE" and insert -- SCOTCHLITE --, therefor.

Column 16

Line 45-53 (approx.), after " 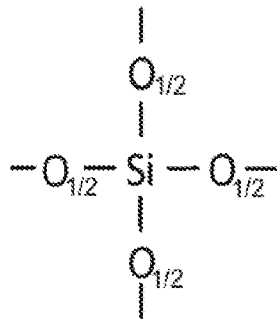 " insert -- , --.

Signed and Sealed this
Seventh Day of November, 2017

Joseph Matal
*Performing the Functions and Duties of the
Under Secretary of Commerce for Intellectual Property and
Director of the United States Patent and Trademark Office*